Patented Aug. 11, 1953

2,648,639

UNITED STATES PATENT OFFICE 2,648,639

CALCIUM MANGANATE-ALUMINUM OXIDE CATALYST

Rufus B. Bennett, Baytown, Tex., assignor, by mesne assignments, to Standard Oil Development Company, Elizabeth, N. J., a corporation of Delaware No Drawing. Application June 28, 1949, Serial No. 101,901

4 Claims. (Cl. 252—463)

1

The present invention is directed to a dehydrogenation catalyst and a method for dehydrogenating hydrocarbons employing the same. More particularly, the invention is directed to the dehydrogenation of paraffinic hydrocarbons.

Prior to the present invention it has been known to dehydrogenate hydrocarbons and many catalysts and processes therefor have been suggested by workers in this field. The dehydrogenation of olefins to diolefins does not present an appreciable problem; however, the dehydrogenation of paraffins to olefins is not so simple since the yields obtainable are low and the conversion of the paraffinic hydrocarbons as well as selectivity to the desired olefin are also low. Furthermore, the high temperature treatment necessary for the formation of olefins from paraffins requires a catalyst which is rugged and unsusceptible to attrition and decomposition due to the excessive temperatures necessary to cause substantial conversion of the paraffinic hydrocarbon to the olefinic hydrocarbon.

It is, therefore, the main object of the present invention to provide a new catalyst suitable for dehydrogenation of paraffinic hydrocarbons to olefinic hydrocarbons.

Another object of the present invention is to provide a rugged and heat resistant catalyst which may be used in dehydrogenating paraffins to olefins.

A still further object of the present invention is to provide a catalyst comprising oxygen-containing compounds of calcium and manganese.

Still another object of the present invention is to provide a process in which paraffinic hydrocarbons are dehydrogenated to olefinic hydrocarbons by contact with an improved catalyst.

The objects of the present invention may be achieved by forming a catalyst composition comprising a major portion of a carrier consisting substantially of aluminum oxide and minor portions of oxygen-containing compounds of calcium and manganese and contacting a heated hydrocarbon such as a paraffinic hydrocarbon with the catalyst at an elevated temperature and pressure under conditions to form a product and recovering the product.

The present invention may be described briefly as a composition comprising a base material of aluminum oxide in a major amount and a catalytic material including oxygen-containing compounds of calcium and manganese which may be present as the oxides or as the calcium manganate ($CaMnO_4$). A heated hydrocarbon feed at an elevated temperature and pressure and particularly a paraffinic hydrocarbon feed is contacted with the improved catalyst under conditions to form a product containing a substantial amount of the dehydrogenated hydrocarbon which is then removed from contact with the catalyst and the dehydrogenated hydrocarbon recovered therefrom.

The catalyst composition of the present invention, as stated before, comprises a major amount of aluminum oxide and minor amounts of oxygen-containing compounds of calcium and manganese. The major amount of aluminum oxide will ordinarily comprise no less than 58% of the catalyst composition, while the minor amounts of oxygen-containing compounds of calcium and manganese may contain respectively calcium calculated as calcium oxide in an amount in the range between 1.4 and 14% by weight of the composition and manganese calculated as manganese oxide in the range between 5.6 and 28% by weight of the composition. The calcium and manganese may be present in the composition either in the form of the calcium manganate or in the form of calcium oxide and manganese oxide. A preferred composition consisting of 20% calcium manganate and 80% aluminum oxide gives satisfactory results in dehydrogenating paraffins.

The aluminum oxide employed in the present invention may contain a small amount of water. In fact an amount of water in the aluminum oxide in the range from 1% to 5% by weight may exert a beneficial effect. As examples of aluminum oxide, those containing 1.4% by weight of water and of 4 to 8 mesh in particle size and those containing 3.4% water and passing 100 mesh perform satisfactorily in the present invention.

In order to illustrate the invention further an improved catalyst in accordance with the present invention was prepared from $Ca(NO_3)_2$, $MnO_2$, and $Al_2O_3$. 325 parts of $Al_2O_3$, 119 parts of $Ca(NO_3)_2$, 43.7 parts of $MnO_2$ and 185 parts of distilled water were placed in a jar mill and mulled for 20 hours. The resulting mixture was of a rich, creamy consistency. After mulling, the mixture was removed from the jar mill, placed in a stainless steel tray and allowed to dry in the presence of air over night in a drying oven at 230° F. After drying, the mixture was heat treated in the presence of air for 30 minutes at 300° F. and thereafter the temperature was increased 100° F. every 15 minutes until a temperature of 800° F. was reached; after 15 minutes at 800° F. the temperature was raised rapidly to 1250° F. and maintained at this temperature for approximately 3 hours. The dried and heated catalyst, as described, was then allowed to cool to 230° F. and was then formed into $\frac{1}{8}$ inch tablets prior to employment as hydrocarbon conversion catalyst according to the present invention. The aforesaid catalyst composition contained approximately 20% calcium manganate and approximately 80% aluminum oxide. This catalyst was placed in a reactor vessel which was heated to a temperature of 1095° F. Normal heptane at a feed rate of one volume of feed per volume of catalyst per hour was then contacted with the heated catalyst at 1095° F. and at atmospheric pressure. A conversion of 54% of the feed was obtained, with 28% selectivity to olefins. The yield obtained was 15.4% by volume (based on the feed) of olefins and 6.1% by volume of aromatics. 3.7% by weight of carbon was produced in this operation.

It will be noted from the foregoing run that the improved catalyst composition allowed the production of over 15% by weight of olefins which is considered a very good yield from the paraffinic hydrocarbon. It will be further noted that the dehydrogenation operation was conducted at atmospheric pressure and in the absence of extraneously added hydrogen. Introducing hydrogen with the feed and employing operating pressures up to 150 p. s. i. g. may result in the effect of markedly reduced carbon formation without adversely affecting olefin selectivity. Thus, it is contemplated that the present invention may be carried out at temperatures from 1075° up to 1400° F. and at pressures from 0 to about 150 p. s. i. g., feed rates from about 0.3 to about 10 volumes of feed per volume of catalyst per hour and hydrogen in an amount from 0 to 3000 standard cubic feet of hydrogen per barrel of naphtha feed.

The carbon deposited on the catalyst may be periodically removed by burning with air employing process cycles from about 1 to about 3 hours under normal operations. However, by introducing steam with the naphtha feed, longer process cycles may be obtained up to as much as 3000 hours with the carbon being removed practically continuously through the water gas reaction which is caused to proceed by the introduction of steam with the feed hydrocarbon.

While the present invention has greatest utility in dehydrogenating paraffinic to olefinic hydrocarbons it may also be used in the so-called hydro-forming process in which naphthene hydrocarbons are converted or hydroformed to aromatic hydrocarbons; when such operations are conducted it may be desirable to use lower temperatures in the range from about 900° to 1200° F., pressures in the range given and with hydrogen being added extraneously. The invention is also adapted to the conversion of olefins to diolefins and under these conditions it may be desirable to employ higher temperatures in the range given with the introduction of steam with the olefinic hydrocarbon feed to promote the water gas reaction.

The hydrocarbons employed as feed stocks may comprise the butanes, butylenes, pentanes, pentylenes, methylcyclopentanes, cyclohexane, methylcyclohexane, hexanes, heptanes, octanes, and other representative olefinic, paraffinic, and naphthenic hydrocarbons.

While the invention has been described and illustrated by reference to employing substantially pure hydrocarbons of the several types mentioned, the invention is not restricted thereto, but may be employed on a mixture of hydrocarbons. For example, if a mixture of hydrocarbons comprising paraffinic and naphthenic hydrocarbons is charged the net effect would be to dehydrogenate the paraffins and naphthenes to produce olefins and aromatics which would result in a substantial improvement in octane rating of the gasoline.

The invention has been described and illustrated by reference to a catalyst comprising a major portion of aluminum oxide. It is to be clearly understood that I may employ aluminum oxide in its various commercial forms available on the market and that the alumina may contain other materials besides aluminum oxide. Examples of alumina finding use in the present invention may be found in U. S. 2,217,013 issued to Grosse et al., October 8, 1940.

The nature and objects of the present invention having been fully described and illustrated, what I wish to claim as new and useful and to secure by Letters Patent is:

1. A catalyst composition adapted for converting hydrocarbons consisting essentially of no less than 58% by weight of aluminum oxide and no less than 7% by weight and no more than 42% by weight of a mixture of oxides of calcium and manganese in the range between 1.4% and 14% by weight and in the range between 5.6% and 28% by weight calculated, respectively, as calcium and manganese oxides.

2. A catalyst composition adapted for dehydrogenating hydrocarbons consisting essentially of no less than 58% by weight of an aluminum oxide carrier and no less than 7% by weight and no more than 42% by weight of calcium manganate.

3. A composition in accordance with claim 2 in which the calcium is present as the oxide in a range between 1.4 and 14% by weight of the composition and the manganese is present as the oxide in an amount in the range between 5.6 and 28% by weight of the composition and the remainder is aluminum oxide.

4. A catalyst composition adapted for dehydrogenating hydrocarbons which comprises approximately 20% by weight calcium manganate and approximately 80% by weight of aluminum oxide.

RUFUS B. BENNETT.

References Cited in the file of this patent

UNITED STATES PATENTS

| Number | Name | Date |
|---|---|---|
| 2,184,235 | Groll et al. | Dec. 19, 1939 |
| 2,419,997 | Houdry | May 6, 1947 |
| 2,427,707 | Brimm | Sept. 23, 1947 |
| 2,431,427 | Schulze et al. | Nov. 25, 1947 |
| 2,436,721 | Laughlin et al. | Feb. 24, 1948 |
| 2,444,509 | Ipatieff et al. | July 6, 1948 |
| 2,517,223 | Mantell | Aug. 1, 1950 |